United States Patent [19]
Barie, Jr.

[11] 3,948,849
[45] Apr. 6, 1976

[54] ADHESIVE COMPOSITIONS
[75] Inventor: Walter P. Barie, Jr., Shaler Township, Pa.
[73] Assignee: Gulf Research & Development Company, Pittsburgh, Pa.
[22] Filed: Nov. 1, 1974
[21] Appl. No.: 520,018

[52] U.S. Cl........ 260/37 EP; 260/42.22; 260/42.32; 260/837 R
[51] Int. Cl.² ..................................... C08L 63/10
[58] Field of Search . 260/37 EP, 37 M, 836, 837 R, 260/47 EA

[56] References Cited
UNITED STATES PATENTS
3,502,609   3/1970   Barie et al. ................. 260/47 EA X
3,655,818   4/1972   McKown ..................... 260/37 EP X
3,678,130   7/1972   Klapprott et al. ............... 260/836 X Primary Examiner—Lewis T. Jacobs

[57] ABSTRACT

A new epoxy resin adhesive composition having high tensile lap shear and T-peel strengths. The composition contains a nitrile rubber-modified epoxy resin, certain solid biphenyl anhydrides having one anhydride function on each phenyl group, and a powdered metal.

9 Claims, No Drawings

ADHESIVE COMPOSITIONS

This invention relates to new and useful epoxy resin adhesive compositions which on curing have excellent tensile lap shear and T-peel strength values both before and after heat aging.

The properties of cured epoxy resin reaction products as adhesives depend, in part, on the nature of the epoxy resins and the cross-linking agents. It is desirable for some adhesive applications that the adhesive have high initial tensile lap shear and T-peel strengths and retain the high tensile lap shear strength and T-peel strength even after being subjected to elevated temperatures for extended periods of time. For example, in the adhesion of metal parts for use in high temperature work, it is frequently important that the adhesive bonds not fail over extended periods of time. It is also desirable to be able to apply these adhesive compositions at room temperature so that no elaborate and expensive application techinques are required.

In accordance with the invention a new adhesive composition suitable for application at room temperature and which on curing results in a resin having excellent tensile lap shear and T-peel strengths with excellent retention of properties after heat aging comprises:

A suspension of a solid biphenyl dianhydride selected from the group consisting of a solid biphenyl tetracarboxylic dianhydride having one anhydride function on each phenyl group as the only phenyl substituent and selected from diphenyl methane tetracarboxylic dianhydrides, benzophenone tetracarboxylic dianhydrides, benzhydrol tetracarboxylic dianhydrides, benzhydrol tetracarboxylic dianhydride lower alkyl ethers, lower alkyl carboxylic acid esters of benzhydrol tetracarboxylic dianhydrides and mixtures thereof; optionally maleic anhydride in substitution of a portion of the biphenyl dianhydride; a liquid 1,2-epoxy resin which contains on the average more than one 1,2-epoxy groups per molecule and which has been modified by reaction with a minor amount of a nitrile rubber; and a finely divided solid filler comprising a powdered metal; the amount of said powdered metal being at least 20 parts per 100 parts of resin and the amount of said anhydride being such that the anhydride to epoxide equivalent ratio is between 0.4 and 1.5.

Any of the liquid epoxy resins well known in the art can be employed in the new compositions of this invention, or any non-liquid epoxy resin which forms a liquid mixture with another epoxy resin. By an epoxy resin is meant any molecule which contains on the average more than one epoxy group. The aromatic type epoxy resins are preferred. The more preferred epoxy resins are generally prepared by the reaction of an epihalohydrin with (1) a polyhydric alcohol, (2) a phenol or (3) a phenol-formaldehyde product. The reaction products are complex mixtures of polyethers having terminal 1,2-epoxide groups and in which alternating intermediate aliphatic hydroxycontaining radicals are linked through ether oxygens to aliphatic or aromatic nuclei.

The high molecular weight complex polyether compositions are thermoplastic, but are capable of forming thermosetting compositions by further reaction through the hydroxy and/or 1,2-epoxide groups with a cross-linking agent. In order to form these thermosetting compositions, the epoxy resin must have a 1,2-epoxide equivalency greater than one, preferably at least about two. By epoxide equivalency is meant the average number of 1,2-epoxide groups contained in the measured molecular weight of the resin. Since the epoxy resin is a mixture of polyethers, the measured molecular weight, upon which the 1,2-epoxide equivalency depends, is necessarily an average molecular weight. Hence, the 1,2-epoxide equivalency of the resin will be a number greater than one, but not necessarily an integer. The epoxide value of an epoxy resin is the number of epoxide groups per 100 grams of resin. If the measured molecular weight and epoxide value are given, the 1,2-epoxide equivalency can easily be determined. For example, an epoxy resin having an average molecular weight of 900 and an epoxide value of 0.2 has a 1,2-epoxide equivalency of 1.8.

The diglycidyl ethers of dihydric phenols either alone or admixed with a polyglycidyl ether of a novolac resin are preferred herein. The diglycidyl ethers of dihydric phenols are generally made by the reaction of epichlorohydrin with a dihydric phenol, bisphenol A being the most frequently utilized dihydric phenol. The preferred diglycidyl ethers of dihydric phenols possess an average molecular weight of about 350 to about 600. As a result of the conventional method of preparation, that is by the reaction of epichlorohydrin and the dihydric phenol, the product is a mixture of molecules of different molecular weights, the preponderance of which possess a molecular weight between about 350 and about 600 in the formulations preferred herein. The polyglycidyl ethers of novolac resins are conventionally made by the reaction of epichlorohydrin with the phenolic hydroxyls in a novolac resin, which is the reaction product of a phenol and formaldehyde, resulting in a mixture of variously sized molecules and a variation in the number of epoxy groups per molecule. The preferred polyglycidyl ethers of novolac resins have an average number of epoxy groups per molecule of between about two and about four.

When a mixture of a diglycidyl ether of a dihydric phenol and a polyglycidyl ether of a novolac resin is used, adhesives producing initial exceptionally high tensile lap shear strengths can be obtained. In order to obtain the exceptionally high tensile lap shear strength, this mixture of the diglycidyl ether of a dihydric phenol and the polyglycidyl ether of a novolac resin contains a weight ratio of the novolac polyepoxide to the dihydric phenol diepoxide as high as 3:1 but preferably no higher than about 2:1. Suitable resins include "Bakelite ERL-2774"; "Bakelite ERL-3794"; "Epi-Rez 510"; "Epon 820" and "Epon 828". "Bakelite" is the trademark of Union Carbide Corporation; "Epi-Rez" is the trademark of Jones-Dabney Co., Division of Devoe and Reynolds Co.; and "Epon" is the trademark of the Shell Chemical Co. Suitable glycidyl ethers of the novolacs include "D.E.N. 431" and "D.E.N. 438" of The Dow Chemical Company and Shell's "Epon 152" and "Epon 154". Suitable cycloaliphatic polyepoxides include "ERL-4201" and "ERL-4221" of Union Carbide Plastics Company. Other suitable polyepoxides are the non-plasticizing epoxy resins set out in Appendix 4-1 of *Handbook of Epoxy Resins* by Lee and Neville, McGraw-Hill Book Company (1967).

The epoxy resin or mixture of epoxy resins is first reacted with a minor amount of a carboxyl terminated nitrile rubber in a cross-linking reaction. The nitrile rubber which can be usefully employed herein is the free radical produced copolymer of butadiene and acrylonitrile. The preferred nitrile rubber is prepared from a molar ratio of butadiene to acrylonitrile of about 5:1 and has an average of about 10 pendant nitrile groups per polymer molecule. Other butadiene-acrylonitrile polymers, having significant variations in their butadiene to acrylonitrile ratios and molecular weights from this preferred nitrile rubber, are useful herein provided that they possess the required rubber-like characteristics. The polymer molecules are terminated with carboxyl groups, that is, about two carboxyl groups per molecule. In the reaction of the nitrile rubber with the epoxy resin, the carboxyl groups in the nitrile rubber are caused to react with epoxy groups in the epoxy resin. Since the amount of the nitrile rubber that is used is small, this cross-linking reaction only effects a slight thickening of the epoxy resin. I have determined that for superior properties as an adhesive the ratio of epoxy groups in the epoxy resin to carboxyl groups in the nitrile rubber can desirably range from about 50 to about 500, and preferably from about 65 to about 250. When the nitrile rubber is used with the diglycidyl ether of bisphenol A having an epoxy equivalent weight of about 188, about two to about 20 parts by weight, preferably about four to about 15 parts of the nitrile rubber are used per 100 parts of the epoxy resin.

The epoxy resins used in the compositions of this invention are hardened or cured by the use of at least one anhydride cross-linking agent. The one anhydride is a biphenyl dianhydride having at least one anhydride function on each phenyl group and wherein the phenyl groups are linked through a single carbon atom.

The preferred biphenyl dianhydrides are selected from the group consisting of a solid biphenyl tetracarboxylic dianhydride having one anhydride function on each phenyl group as the only phenyl substituent and selected from diphenyl methane tetracarboxylic dianhydrides, benzophenone tetracarboxylic dianhydrides, benzhydrol tetracarboxylic dianhydrides, benzhydrol tetracarboxylic dianhydride lower alkyl ethers, lower alkyl carboxylic acid esters of benzhydrol tetracarboxylic dianhydrides and mixtures thereof.

Suitable examples of biphenyl dianhydrides for use in the compositions of this invention include the following:

3,4,3',4'-diphenylmethane tetracarboxylic dianhydride;
2,3,2',3'-diphenylmethane tetracarboxylic dianhydride;
2,3,3',4'-diphenylmethane tetracarboxylic dianhydride;
3,4,3',4'-benzhydrol tetracarboxylic dianhydride;
2,3,2',3'-benzhydrol tetracarboxylic dianhydride;
2,3,3',4'-benzhydrol tetracarboxylic dianhydride;
3,4,3',4'-benzhydrol tetracarboxylic dianhydride methyl ether;
3,4,3',4'-benzhydrol tetracarboxylic dianhydride ethyl ether;
2,3,3',4'-benzhydrol tetracarboxylic dianhydride propyl ether;
2,3,2',3'-benzhydrol tetracarboxylic dianhydride butyl ether;
3,4,3',4'-benzhydrol tetracarboxylic dianhydride acetate;
3,4,3',4'-benzhydrol tetracarboxylic dianhydride propionate;
2,3,3',4'-benzhydrol tetracarboxylic dianhydride butyrate;
3,4,3',4'-benzophenone tetracarboxylic dianhydride;
2,3,2',3'-benzophenone tetracarboxylic dianhydride;
2,3,3',4'-benzophenone tetracarboxylic dianhydride;

It has also been found that the activity of the biphenyl dianhydride is a function of the free acid content of the anhydride. It is preferred that the phenyl anhydride be substantially free of carboxylic acid groups, and in any case, the percent free acids in the biphenyl dianhydride should be less than 6 weight percent, and preferably less than about two weight percent.

Maleic anhydride can be incorporated into the resin mixture to modify and improve the properties of the resulting adhesive. When it is used, the maleic anhydride can comprise as high as about 75 weight percent of the total anhydride component which includes the biphenyl dianhydride and preferably, when used, it comprises no higher than about 50 weight percent of the total anhydride component.

The ratio of the chemical anhydride equivalents to the chemical epoxide equivalents of the epoxy resin (an A/E ratio) is suitably maintained between 0.4 and 1.5 with a preferred ratio between 0.55 and 0.9 and a most preferred ratio between 0.58 and 0.63.

It has been found that the addition of fillers comprising a powdered metal and, in particular, the addition of a combination of a metallic and non-metallic oxide filler results in adhesive formulations having unexpectedly improved tensile lap shear and T-peel strengths. Suitable metallic fillers include finely divided (powdered) metals, exemplified but not limited to aluminum and iron.

The addition of a finely divided, non-metallic oxide, such as silicon dioxide, along with the powdered metal has an unexpected effect on increasing the tensile lap shear strength and T-peel strength of the adhesive. In addition to silicon dioxide, suitable non-metallic oxide materials include alumina, calcium carbonate, magnesium silicate, alumina silicate, kaolin, hydrated alumina and thixotropic agents, such as bentonite clays.

The fillers, both metallic and non-metallic oxides, can range in particle size between 200 mesh to about 0.015 micron. The amount of filler to be employed depends to some extent upon the thickening properties of the particular filler chosen. The metallic fillers, such as powdered aluminum, tend to have less thickening effect on the epoxy resin than the non-metallic materials, such as the alumina silicates. The amount of metallic filler should be at least 20 parts per hundred parts of unmodified epoxy resin (phr.) and can suitably be as high as 200 parts per hundred parts of resin (phr.) with the preferred amount of metallic filler being between 80 and 120 phr. Much lower amounts of the non-metallic oxide thickener type fillers are employed, amounts between 1 and 50 parts being generally satisfactory and preferred amounts being between one and 20 phr.

As noted, the best adhesive formulations are those which use a combination of a powdered metallic filler, such as aluminum, and a finely divided non-metallic oxide filler, such as silicon dioxide. Particularly preferred combinations are those using between 80 and 120 phr. of powdered metals and between 1 and 10 phr. of the non-metallic oxide fillers.

It has been found that the biphenyl dianhydride cross-linking agents defined above are substantially insoluble in the liquid, nitrile rubber-modified epoxy resins at room temperature. The solubility of the biphenyl dianhydride in the epoxy resin increases upon heating the epoxy resin, but due to the high functionality and therefore the high activity of the biphenyl dianhydrides, the heating of the epoxy resin before or during the addition of the biphenyl dianhydride cross-linking agent results in rapid gelation and solidification of the epoxy resin composition. The mixture of components is obtained by suspending the finely divided solid biphenyl dianhydride in the liquid, nitrile rubber-modified, epoxy resin. The suspension is formed by subjecting a mixture of the powdered solid biphenyl dianhydride and the liquid, nitrile rubber-modified, epoxy resin to a high shear mixing action for a time sufficient to maintain the solid biphenyl dianhydride in suspension at room temperature for a period of at least seven days. Any suitable means can be employed to achieve the desired suspension. One suitable means involves passing the admixture of the finely divided solid biphenyl dianhydride and the liquid, nitrile rubber-modified, epoxy resin through a three-roll mill. Other suitable means would include the use of ball mills or chain mills. Simple mechanical stirring is insufficient to achieve the desired results, especially with the lower viscosity liquid, nitrile rubber-modified, epoxy resins.

After the incorporation of the solid biphenyl dianhydride into the liquid, nitrile rubber-modified, epoxy resin to form a suspension, the desired fillers in the above described amounts can then be added with simple mechanical stirring if the powdered metals are sufficiently finely divided.

Properties of the hardened epoxy resins are affected by the curing conditions wherein more complete crosslinking occurs. Curing can occur at temperatures between about 150° and 280° C. for time periods as short as 5 minutes to times as long as 2 days or more. In general, the higher the curing temperature, the shorter the time required to produce a completely cured epoxy resin product. The preferred curing temperatures are between 150° and 240° C. at cure times between 0.1 and 48 hours with more preferred cure times between 0.25 and 5 hours.

The adhesive compositions of this invention are applied to a suitable substrate at room temperature or thereabouts before curing. Since elevated temperatures are required for curing, the substrate should be such that it is not damaged by the high curing temperatures required. Normally, the adhesives of this invention are employed for the attachment of one metallic part to another, although ceramic or other heat resistant materials can also suitably be joined together with the adhesive compositions of this invention. It has been found that the prior treatment of the substrate is important so far as the strength of the adhesive bond is concerned. For example, the metallic surface can be sandblasted or acid-etched, with acid-etching being the preferred procedure for preparing a metal surface for bonding using the adhesive compositions of this invention.

In addition, various well-known cure accelerators, such as tertiary amines, can be added to the compositions, if desired. Suitable accelerators include benzyldimethylamine; alpha-methylbenzyldimethylamine; dimethylaminopropylamine; dimethylaminomethyl phenol (DMP-10 by Rohm and Haas); and tris(dimethylaminomethyl)phenol (DMP-30). Strongly acidic materials, such as boron trifluoride can also be used. The resin mixture can also be suitably cured with a metal complex of acetylacetone such as zinc acetylacetonate, iron acetylacetonate, aluminum acetylacetonate, magnesium acetylacetonate, nickel acetylacetonate, zirconium acetylacetonate, and the like, in the range of about 0.1 to about five parts per hundred parts of resin and preferably a range of about 0.5 to about three parts per hundred parts of resin.

The invention will be further described with reference to the following experimental work.

The epoxy resins employed in the series of epoxy resin compositions to be discussed below were Epon 828, a diglycidyl ether of bisphenol A having an epoxide equivalent weight of 175–210 and a viscosity (cps.) at 25° C. between 10,000 and 20,000 and D.E.N. 438, a polyglycidyl ether of a novolac resin having an average of 3.6 epoxy groups per molecule and a viscosity (cps.) at 52° C. of 35,000 to 70,000. The adhesive formulations employed Hycar CTBN, a carboxyl-terminated nitrile rubber having a number average molecular weight of about 3,270 and a butadiene to acrylonitrile ratio of about 5:1 and sold by B. F. Goodrich Chemical Company. The nitrile rubber-modified epoxy resin was prepared by adding the carboxyl terminated nitrile rubber to the epoxy resin at room temperature and heating the mixture with stirring at 160° C. for ½ hour.

The biphenyl dianhydride used in all of the adhesive compositions was 3,4,3',4'-benzophenone tetracarboxylic dianhydride (hereinafter BTDA). The BTDA was ground to a fine powder form (325 mesh) and was added to the nitrile rubber-modified epoxy resin at room temperature. The mixture of epoxy resin and anhydride was then subjected to high shear mixing in a three-roll mill (purchased from Charles Ross and Son Co., Inc. of Brooklyn, N.Y.) for a time sufficient to result in a stable suspension of the anhydride in the epoxy resin. By a stable suspension is meant the anhydride did not noticeably settle out on standing for a period in excess of seven days at room temperature. Usually between two and 10 runs through the mill are sufficient which takes between one and 10 minutes of mixing. The maleic anhydride, when used, was ground together with the BTDA to form the mixed anhydride component.

A first series of epoxy resin adhesive compositions was made using Epon 828 and varying amounts of Hycar CTBN with BTDA as the biphenyl dianhydride in an amount to provide an A/E ratio of 0.6. The BTDA and 2 parts of zinc acetylacetonate per hundred parts of unmodified epoxy resin were added to the nitrile rubber-modified epoxy resin and these components were mixed together in the three-roll mill. The mixture was removed from the three-roll mill and 100 parts of atomized aluminum and three parts of Cab-O-Sil (a submicroscopic pyrogenic silica sold by Cabot Corporation) per hundred parts of the unmodified epoxy resin were mixed in at room temperature using a motor-driven stirrer.

The formulations were used to join a series of two four-inch (102 mm.) by 1 inch (25.4 mm.) pieces of acid-etched Alclad 2024T3 aluminum (an aluminum alloy sold by Aluminum Company of America) which were 0.032 inch (0.82 mm.) thick. The joined pieces were cured at 150° C. for 15 minutes. A first group of the cured samples was tested for tensile lap shear strength in psi. (one psi equals 0.0703 Kg./cm$^2$) before and after heat aging by ASTM D1002 test procedure. The results of these tests are set forth in Table I. In the tables 73° F. is 22.8° C. and 500° F. is 260° C.

Table I

| Heat aging Test temp., °F. Nitrile rubber<sup>a</sup> | Tensile Lap Shear Strength, psi. | | | |
|---|---|---|---|---|
| | None | | 500° F. for 500 hours | |
| | 73 | 500 | 73 | 500 |
| 0 | 2,360 | 790 | 1,040 | 1,210 |
| 2 | 2,800 | 800 | 1,140 | 1,070 |
| 4 | 2,520 | 820 | 1,050 | 1,070 |
| 10 | 2,560 | 970 | 960 | 1,120 |
| 15 | 2,890 | 850 | 810 | 1,090 |

<sup>a</sup>Parts of nitrile rubber per 100 parts of epoxy resin.

A second group of the identical, cured samples was tested for T-peel strength in pounds per inch of width (1 lb./inch = 0.18 kg./cm.) by ASTM D1876-61T which determined the peel resistance of the adhesive formulations. The results are set forth in Table II.

Table II

| Heat aging Test temp., °F. Nitrile rubber<sup>a</sup> | T-Peel Strength, lbs./inch of width | |
|---|---|---|
| | None | 500° F. for 500 hours |
| | 73 | 73 |
| 0 | 2.70 | 0.63 |
| 2 | 2.06 | 0.49 |
| 4 | 2.93 | 0.55 |
| 10 | 5.45 | 0.64 |
| 15 | 5.25 | 0.61 |

<sup>a</sup>Parts of nitrile rubber per 100 parts of epoxy resin.

A second series of epoxy resin compositions was made up using a mixture of two parts by weight of D.E.N. 438 per part of Epon 828 as the epoxy resin component and varying amounts of Hycar CTBN. The anhydride component was a mixture of one part BTDA and one part maleic anhydride in sufficient amount to provide an A/E ratio of 1.15. The adhesive compositions were prepared in the same manner using the same quantities of atomized aluminum, Cab-O-Sil and zinc acetylacetonate as were used in the first series. This adhesive formulation was also used to join pieces of acid-etched Alclad 2024T3 which were cured in the same manner as the first series. A group of this second series was tested for tensile lap shear strength resulting in the data set forth in Table III.

Table III

| Heat aging Test temp., °F. Nitrile rubber<sup>a</sup> | Tensile Lap Shear Strength, psi. | | | |
|---|---|---|---|---|
| | None | | 500°F. for 500 hours | |
| | 73 | 500 | 73 | 500 |
| 0 | 4,000 | 345 | 720 | 760 |
| 2 | 3,730 | 500 | 700 | 660 |
| 4 | 3,680 | 450 | 740 | 790 |
| 10 | 3,130 | 340 | 950 | 700 |
| 15 | 3,200 | 370 | 700 | 600 |

<sup>a</sup>Parts of nitrile rubber per 100 parts of epoxy resin.

A second group of this second series was also tested for T-peel strength to determine the peel resistance of the adhesive formulations. These results are set forth in Table IV.

Table IV

| Heat aging Test temp., °F. Nitrile rubber<sup>a</sup> | T-Peel Strength, lbs./inch of width | |
|---|---|---|
| | None | 500° F. for 500 hours |
| | 73 | 73 |
| 0 | 2.80 | 0.61 |
| 2 | <sup>b</sup> | <sup>b</sup> |
| 4 | 5.80 | 0.21 |
| 10 | 5.40 | 0.44 |
| 15 | 5.50 | 0.51 |

<sup>a</sup>Parts of nitrile rubber per 100 parts of epoxy resin.
<sup>b</sup>These samples failed apparently as a result of an inadvertent mishandling unrelated to the formulation or test.

These results demonstrate that different formulations and proportions of a nitrile rubber-modified epoxy resin component and an anhydride curing agent which includes a solid biphenyl dianhydride will result in adhesive bonds having a variety of useful combinations of improved tensile lap shear and T-peel strengths before and after heat aging. Thus, suitable adhesive formulations can be readily prepared to accomplish improved strength properties appropriate for a great variety of applications.

It is to be understood that the above disclosure is by way of specific example and that numerous modifications and variations are available to those of ordinary skill in the art without departing from the true spirit and scope of the invention.

I claim:

1. An adhesive composition suitable for application at room temperature and which on curing results in a resin having improved tensile lap shear and T-peel strengths and improved heat aging properties which consists essentially of an anhydride component consisting of a solid biphenyl dianhydride having one anhydride function on each phenyl group as the only phenyl substituent selected from diphenyl methane tetracarboxylic dianhydrides, benzophenone tetracarboxylic dianhydrides, benzhydrol tetracarboxylic dianhydrides, benzhydrol tetracarboxylic dianhydride lower alkyl ethers, lower alkyl carboxylic acid esters of benzhydrol tetracarboxylic dianhydrides and mixtures thereof, and up to about 75 weight percent maleic anhydride;

sufficient liquid, nitrile rubber-modified epoxy resin selected from a diglycidyl ether of bisphenol A and mixtures thereof to result in an A/E ratio of about 0.4 to about 1.5, said nitrile rubber comprising a carboxyl terminated free radical copolymer of butadiene and acrylonitrile in which the carboxyl groups of the nitrile rubber are reacted with epoxy groups of the epoxy resin; and a finely divided solid filler comprising a powdered metal;

said nitrile rubber being used in an amount to provide a ratio of about 50 to about 500 epoxy groups in the unmodified epoxy resin per carboxyl group in the nitrile rubber and said powdered metal being used in an amount of at least 20 parts per 100 parts of unmodified epoxy resin.

2. An adhesive composition in accordance with claim 1 wherein said anhydride component is 3,4,3',4'-benzophenone tetracarboxylic dianhydride and the A/E ratio is between about 0.55 and about 0.9.

3. An adhesive composition in accordance with claim 1 wherein said anhydride component is 3,4,3',4'-benzhydrol tetracarboxylic dianhydride and the A/E ratio is between about 0.55 and about 0.9.

4. An adhesive composition in accordance with claim 1 in which said solid filler comprises a powdered metal in an amount between about 20 and 200 parts per hundred parts of unmodified epoxy resin and a finely divided non-metallic oxide in an amount between about one and about 50 parts of unmodified epoxy resin.

5. An adhesive composition in accordance with claim 4 in which said epoxy resin is a liquid diglycidyl ether of bisphenol A, said anhydride component is 3,4,3',4'-benzophenone tetracarboxylic dianhydride, the nitrile rubber is a carboxyl terminated copolymer of butadiene and acrylonitrile in a molar ratio of about five to one and having an average of about 10 nitrile groups per molecule, said powdered metal is aluminum and said non-metallic oxide is silicon dioxide.

6. A cured epoxy resin adhesive composition having improved tensile lap shear and T-peel strengths consisting essentially of
an epoxy resin selected from liquid diglycidyl ethers of bisphenol A and liquid mixtures of more than one diglycidyl ether of bisphenol A cross-linked (1) with from about two to about 20 parts by weight of a carboxyl terminated nitrile rubber and (2) with sufficient anhydride component consisting of a solid biphenyl dianhydride having one anhydride function on each phenyl group as the only phenyl substituent selected from diphenyl methane tetracarboxylic dianhydrides, benzophenone tetracarboxylic dianhydrides, benzhydrol tetracarboxylic dianhydrides, benzhydrol tetracarboxylic dianhydride lower alkyl ethers, lower alkyl carboxylic acid esters of benzhydrol tetracarboxylic dianhydrides and mixtures thereof, and up to about 75 weight percent maleic anhydride to provide an A/E ratio of between about 0.4 and about 1.5; and
between about 20 parts and about 200 parts of a filler comprising a powdered metal per 100 parts of epoxy resin.

7. A cured adhesive composition in accordance with claim 6 in which said anhydride component is 3,4,3',4'-benzophenone tetracarboxylic dianhydride.

8. A cured adhesive composition in accordance with claim 7 in which said filler is between about 80 and about 120 phr. of aluminum powder and about one to 20 phr. of silicon dioxide.

9. A cured adhesive composition in accordance with claim 6 wherein said carboxyl-terminated nitrile rubber is a copolymer of butadiene and acrylonitrile in a molar ratio of about five to one having an average of about 10 nitrile groups per molecule.

* * * * *